United States Patent [19]
Mixon, Jr.

[11] Patent Number: 5,347,765
[45] Date of Patent: Sep. 20, 1994

[54] DEVICE AND METHOD FOR MULTIPLE USES OF A PORTABLE GRINDER

[76] Inventor: Harold W. Mixon, Jr., Rte. 4, Box 377, Perry, Fla. 32347

[21] Appl. No.: 17,001

[22] Filed: Feb. 12, 1993

[51] Int. Cl.⁵ .............................. B24B 1/00
[52] U.S. Cl. ................. 451/28 R; 451/442; 279/145; 7/158
[58] Field of Search ............ 51/262 R, 281 R, 170 R, 51/181 R; 279/142, 143, 145; 7/158, 170

[56] References Cited

U.S. PATENT DOCUMENTS

| | | | |
|---|---|---|---|
| 1,372,577 | 3/1921 | Wallenberg | 279/143 |
| 1,478,993 | 12/1923 | Tillman | |
| 2,504,880 | 4/1950 | Rittenhouse | |
| 4,468,895 | 9/1984 | Signorelli | 279/145 |
| 4,944,641 | 7/1990 | Alves | 7/158 |
| 4,947,588 | 8/1990 | Steger | 51/206 R |
| 5,033,552 | 7/1991 | Hu | 51/181 R |

FOREIGN PATENT DOCUMENTS

| | | | |
|---|---|---|---|
| 208039 | 1/1957 | Australia | 51/170 R |
| 510294 | 10/1930 | Fed. Rep. of Germany | 51/170 R |

*Primary Examiner*—Roscoe V. Parker
*Attorney, Agent, or Firm*—H. L. Allen

[57] ABSTRACT

A device is used to adapt a portable angle grinder for use with a drill chuck and associated drill chuck accessories. The device engages the spindle of the grinder to the drill chuck and provides the interface necessary to permit the grinder to be compatible with the drill chuck. The device and method of using the device is described for a variety of trades and tasks associated with those trades.

14 Claims, 3 Drawing Sheets

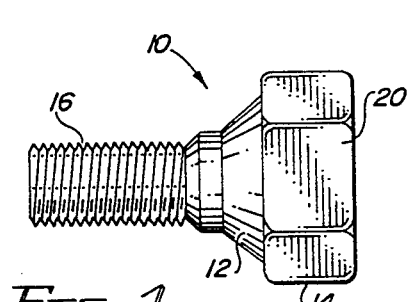
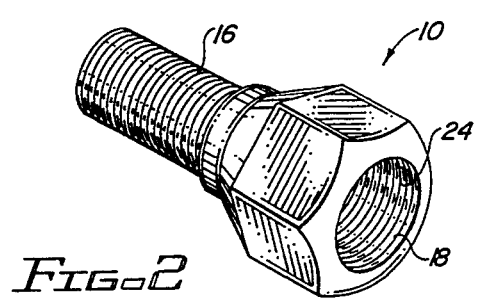
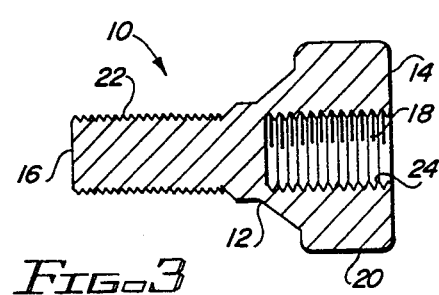
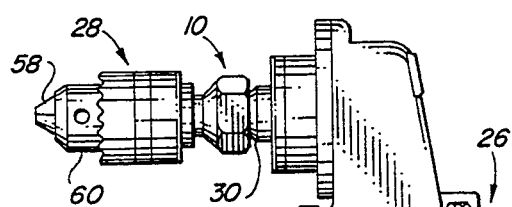
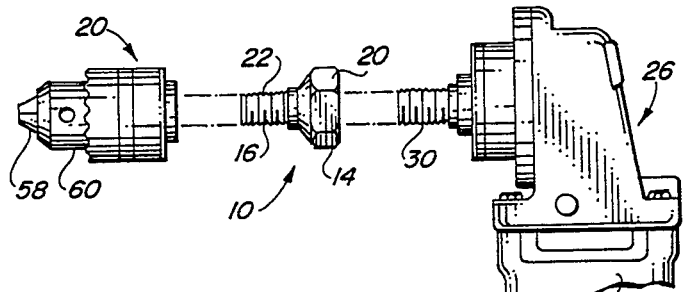
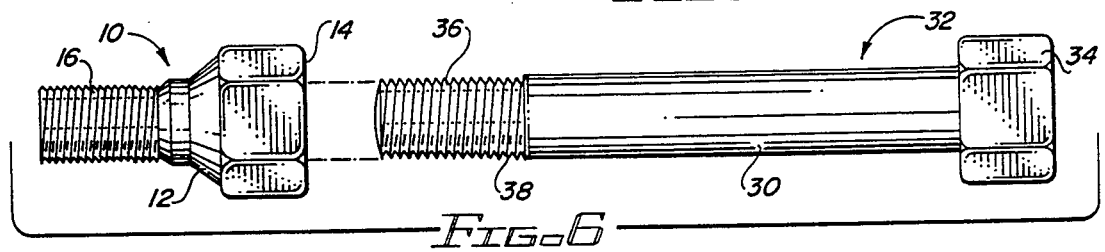
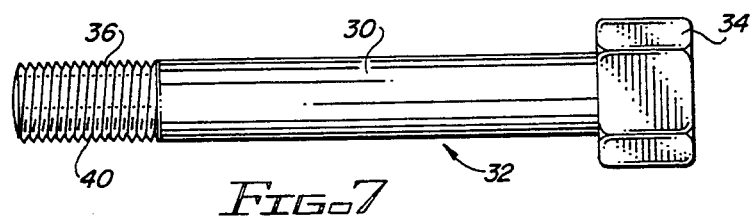

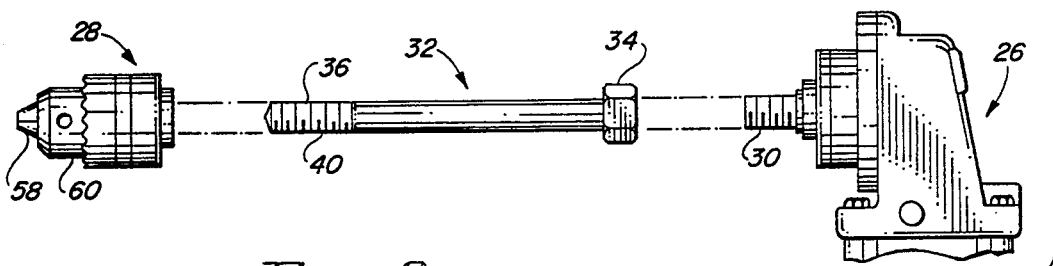

FIG. 8

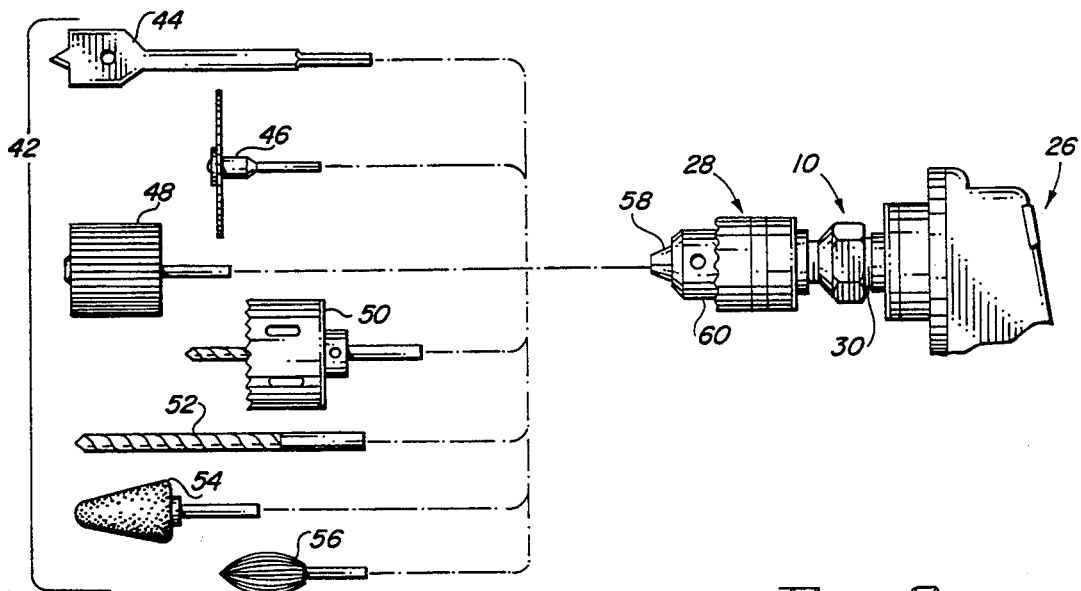

FIG. 9

| DRILL CHUCK ACCESSORIES LEGEND: ● = GENERALLY USED − = NOT NECESSARILLY USED | ELECTRICIAN | PLUMBER | CARPENTER | LOCKSMITH | APPLIANCE | MECHANIC | AUTOBODY | SHEET METAL | MUFFLER SHOP | PIPE WELDER | TUBE WELDER |
|---|---|---|---|---|---|---|---|---|---|---|---|
| TRADE/ACCESSORY | A | B | C | D | E | F | G | H | I | J | K |
| 1 COUNTERSINK | − | − | ● | ● | − | − | − | − | − | − | − |
| 2 DISC RASP | − | − | ● | − | − | − | − | − | − | − | − |
| 3 DRILL BITS (52) | ● | ● | ● | ● | ● | ● | ● | ● | ● | − | − |
| 4 FLAPPER WHEEL (48) | ● | ● | ● | ● | ● | ● | ● | − | ● | ● | ● |
| 5 HOLE CUT SAW BLADES (50) | ● | ● | ● | ● | ● | − | − | − | − | − | − |
| 6 MASONRY BITS | ● | ● | − | ● | ● | − | − | − | − | − | − |
| 7 NUT DRIVER | ● | − | ● | − | ● | − | − | ● | − | − | − |
| 8 RASP BURR BIT/METAL (56) | − | − | − | − | ● | ● | − | − | − | ● | ● |
| 9 RASP BURR BIT/WOOD | − | − | ● | − | ● | − | − | − | − | − | − |
| 10 SANDPAPER DISC | − | ● | ● | − | − | ● | ● | − | − | − | − |
| 11 SCREWDRIVER TIPS | − | ● | ● | ● | ● | ● | − | ● | − | − | − |
| 12 WAFER DISC (46) | ● | ● | − | ● | ● | ● | ● | ● | ● | ● | ● |
| 13 WOOD BITS (44) | ● | ● | ● | ● | ● | − | − | − | − | − | − |
| 14 PENCIL ROCK (54) | − | − | − | − | − | − | − | − | − | ● | ● |

FIG. 10

| TOOLS OF THE TRADE<br>LEGEND:<br>○ = TOOL TYPICALLY USED IN THE TRADE<br>● = TOOL WILL CONTINUE TO BE USED WITH THE INVENTION<br>■ = TOOL IS USED WITH THE INVENTION<br>△ = NOT TYPICALLY USED IN THE TRADE | ELECTRICIAN | PLUMBER | CARPENTER | LOCKSMITH | APPLIANCE | MECHANIC | AUTOBODY | SHEET METAL | MUFFLER SHOP | PIPE WELDER | TUBE WELDER |
|---|---|---|---|---|---|---|---|---|---|---|---|
| TRADES / TOOLS | A | B | C | D | E | F | G | H | I | J | K |
| 1 ANGLE / SIDE GRINDER | ● | ■ | ■ | ■ | ■ | ■ | ● | ■ | ● | ● | ● |
| 2 ALLEN WRENCHES | ● | △ | △ | △ | △ | ○ | △ | △ | △ | △ | △ |
| 3 BIG GRINDER | △ | △ | △ | △ | △ | △ | △ | △ | △ | ● | △ |
| 4 CABLE / BOLT CUTTER | ○ | △ | ○ | △ | △ | △ | △ | △ | △ | △ | △ |
| 5 CHOP SAW | △ | △ | △ | △ | △ | △ | △ | △ | △ | ● | △ |
| 6 COMMON HAND TOOLS | ● | △ | ● | △ | ● | ● | ● | △ | △ | △ | △ |
| 7 DENT PULLER | △ | △ | △ | △ | △ | △ | ● | △ | △ | △ | △ |
| 8 DUAL CLAMPS | △ | △ | △ | △ | △ | △ | △ | △ | △ | ● | △ |
| 9 ELECTRIC DRILL | ○ | ○ | ○ | ○ | ○ | ○ | ○ | ○ | ○ | ● | ● |
| 10 ELECTRIC PIPE BENDER | ● | ● | △ | △ | △ | △ | △ | △ | △ | ● | △ |
| 11 ELECTRIC PIPE THREADER | ● | ● | △ | △ | △ | △ | △ | △ | △ | △ | △ |
| 12 ELECTRIC SANDER | △ | △ | ○ | △ | △ | ○ | ○ | △ | ○ | △ | △ |
| 13 ELECTRIC SCREWDRIVER | △ | △ | ○ | ○ | ○ | ○ | △ | ○ | △ | △ | △ |
| 14 HACK SAW | ○ | ○ | △ | ○ | ○ | ○ | ○ | △ | ○ | △ | △ |
| 15 HAND FILES | △ | △ | △ | ● | △ | △ | ● | △ | △ | △ | ● |
| 16 HOLE CUTTING SAW | ○ | ○ | ○ | ○ | ○ | △ | △ | △ | △ | △ | △ |
| 17 HYDRAULIC / AIR TOOLS | ● | △ | △ | △ | △ | ● | ● | △ | △ | △ | ○ |
| 18 JACKSTANDS | ● | △ | △ | △ | △ | ● | ○ | △ | ○ | △ | △ |
| 19 JIG SAW | △ | ○ | △ | △ | ○ | △ | △ | △ | △ | △ | △ |
| 20 KEY MAKER | △ | △ | △ | ● | △ | △ | △ | △ | △ | △ | △ |
| 21 KNOCK-OUT SET | ○ | △ | △ | △ | △ | △ | △ | △ | △ | △ | △ |
| 22 METERS | ● | △ | △ | △ | ○ | △ | △ | △ | △ | △ | △ |
| 23 NUT DRIVER | ○ | △ | △ | △ | △ | △ | △ | ● | △ | △ | △ |
| 24 PIN WHEEL GRINDER | ○ | △ | △ | △ | △ | ○ | ○ | △ | △ | ○ | ○ |
| 25 PIPE WRENCHES | △ | ● | △ | △ | △ | △ | △ | △ | ● | △ | △ |
| 26 PLANER | △ | △ | ● | △ | △ | △ | △ | △ | △ | △ | △ |
| 27 PORTABLE BAND SAW | ○ | ○ | △ | △ | △ | △ | △ | △ | △ | △ | △ |
| 28 RIBBON SANDPAPER | △ | △ | △ | △ | ○ | △ | △ | △ | ○ | △ | ● |
| 29 RIDGE CUTTER | △ | △ | △ | △ | △ | ○ | △ | △ | △ | △ | △ |
| 30 RIGID ELECTRIC THREADER | ● | ● | △ | △ | △ | △ | △ | △ | △ | △ | △ |
| 31 RIGID PIPE CUTTER | △ | ○ | △ | △ | △ | △ | △ | △ | △ | △ | △ |
| 32 SKILL SAW | △ | △ | ● | △ | △ | △ | △ | ● | △ | △ | △ |
| 33 TIN SNIPS | △ | △ | △ | △ | ○ | △ | △ | ○ | △ | △ | △ |
| 34 TORCH | ● | ● | △ | △ | ○ | ● | ○ | △ | ● | ● | ● |
| 35 TUBE CUTTER | △ | ● | △ | △ | ○ | △ | △ | △ | △ | △ | △ |
| 36 WINCHES | ● | △ | △ | △ | △ | △ | △ | △ | △ | △ | △ |
| 37 WOOD RASP | △ | △ | ● | △ | △ | △ | △ | △ | △ | △ | △ |

FIG. 11

DEVICE AND METHOD FOR MULTIPLE USES OF A PORTABLE GRINDER

BACKGROUND OF THE INVENTION

1. Field of the Invention

The invention relates to a device for use with a portable angle grinder and the use of the device as an interface between the grinder and a drill chuck head.

2. Background Art

As technology advances into our daily lives and into the many machines and appliances used, the technician responsible for the installation and servicing of these machines is required to carry an ever increasing variety of tools. These tools are designed to help him complete a designated task efficiently and safely. With the variety and complexity of the machines comes a need for specialized tools. Many of these tools require specialized motors. Each time a separate tool is needed, the size and weight of a tool box is increased. In addition, the initial cost of setting up a tool box as well as maintaining the tools increases.

U.S. Pat. No. 1,478,993 issued to Joseph T. Tillman on Dec. 25, 1923 discloses a combination tool and grinder having utility in connection with automobile repair. A hand tool is equipped with a small compact and convenient motor which can be used to grind and reseat valves of automobile engines or which can be used as a drill or provided with a grinding wheel and used to finish or grind any desired part.

U.S. Pat. No. 2,504,880 issued to Charles Rittenhouse on Apr. 18, 1950 discloses an arm supported universal portable power tool adapted to perform a large variety of different types of operations such as drilling, grinding, sanding, buffing, brushing, or sawing. A portable power tool is disclosed having a plurality of tool spindles adapted to mount various different types of drilling, cutting, grinding, sawing and the like tools, so as to universally adapt to performing a large variety of work with a single power driven tool.

Using a barrel sander or a wire wheel brush with a drill is well known in the art. Typical barrel sanders or wire brushes have a shaft affixed that is engaged by a typical drill chuck head. Wheel arbors having a shaft adaptable to be received by the chuck head are also well known in the art. The wheel arbor comprises a threaded shaft end adapted to receive a grinding wheel or the like. The possible inefficiency or inconvenience of having to adapt a required tool to the drill is outweighed by the convenience of having to carry only one motor device.

SUMMARY OF INVENTION

The present invention contemplates a device for use with a portable grinder. The device comprises a member having a proximal end and a distal end. The proximal end is adapted for use with the grinder and the distal end adapted for use with a drill chuck head. Means are provided for removably affixing the proximal end to a grinder spindle. Means are also provided for removably affixing the member distal end to the drill chuck head. In a second embodiment, the member is an elongated member.

In the preferred embodiment, the device comprises a threaded distal end, the threads adapted to be received by the drill chuck head and the proximal end comprises a bored shaft, with the threaded bore engaging a threaded spindle of the grinder.

A method of using the device with a portable grinder and drill chuck head comprises providing a grinder having a threaded spindle and affixing the proximal end of the device member to the spindle. The distal end of the device member is affixed to the drill chuck head. In the preferred embodiment, means for affixing the distal and proximal ends comprises threads affixed to the ends. The threads at the distal end are engageable with threads in the bore of the drill chuck head and the threads at the proximal end are engageable with the threads of the grinder spindle. The preferred embodiment comprises the use of the device with a portable side grinder.

It is an object of the invention to permit skilled servicemen of various trades to perform the multitude of tasks for their specific trade as efficiently and safely as possible. In the way of example, an electrician typically uses as many as twenty different tools to perform the tasks facing him at a job site. By incorporating the invention into his servicing efforts, the electrician could conceivably reduce the amount of tools to approximately half his typical inventory. More important than reducing the amount of tools needed is the fact that the electrician will be able to dramatically lighten his load by reducing the number of motor driven tools which account for most of the weight and maintenance in the tool inventory. As will be illustrated in the detailed description to follow, the electrician can choose to eliminate as many as five motor driven tools and thus considerably reduce his tool weight and tool maintenance. For the cases where construction or manufacturing operations require an electrician to check out his tools each day from a tool crib, valuable time and inventory control efforts will be saved resulting in more time available on the job site and less overhead cost for both the electrician and his employer.

It is another object of the invention to provide a device that expands the use of the angle grinder or side grinder. As technology and development places greater demands on many of the trades, more and more tools have been developed to meet these demands. Each tool adds cost, weight and maintenance demands on the user. The invention disclosed permits many of the new tasks to be completed without the need for costly additions.

BRIEF DESCRIPTION OF DRAWINGS

A preferred embodiment of the invention and alternate embodiments are described by way of example with reference to the accompanying drawings and tables in which:

FIG. 1 is a side view of the preferred embodiment of the invention;

FIG. 2 is a prospective view of the preferred embodiment as viewed from an end to be engaged with an angle grinder;

FIG. 3 is a cross-sectional view of the preferred embodiment illustrating the typically coarser thread of the proximal end for engaging with a threaded spindle of a grinder and the typically finer thread of the distal end for engaging with a threaded bore of a drill chuck head;

FIG. 4 illustrates the use of the preferred embodiment as a device to permit the angle grinder to be used with the drill chuck head; FIG. 5 illustrates use of the device as in FIG. 4 with the tool components separated in an exploded view to further illustrate engaging elements;

FIG. 6 illustrates an embodiment of the invention used as an extension in combination with the preferred embodiment; FIG. 7 illustrates an alternate embodiment of the device comprising an elongated member; FIG. 8 illustrates in an exploded view the use of an alternate embodiment with the grinder and chuck; FIG. 9 illustrates a partial set of alternate drill chuck accessories to be individually affixed to the chuck while in use with the device; FIG. 10 is a partial list of drill chuck accessories shown as typically used in various exemplary trades; and FIG. 11 illustrates typical "Tools of the Trade" for a partial list of exemplary trades using the device,

DETAILED DESCRIPTION

The preferred embodiment of the invention is a device 10 comprising a member 12 having a proximal end 14 and a distal end 16 as illustrated in FIG. 1. In the preferred embodiment, the proximal end 14 comprises a threaded bore 18 and a plurality of flat surfaces 20. The flat surfaces 20 are engageable by wrenches well known in the art. In the preferred embodiment, the distal end 16 comprises a threaded shaft. FIG. 2 illustrates the preferred embodiment in a perspective view. FIG. 3 is a cross-sectional view illustrating that the device 10 uses a fine thread 22 at the distal end 16 and a coarser thread 24 at the proximal end threaded bore 18.

Referring to FIG. 4, the device 10 is shown in its preferred embodiment with an angle grinder 26 and a drill chuck 28. The grinder 26 illustrated is a portable angle grinder well known in the art and comprises a typical coarse threaded spindle 30. The motor housing 33 of the grinder is such to form a grinder handle 27 having a switch 29 conveniently accessible by the user. By affixing the device 10 to the spindle 30, the grinder 26 is adaptable to be used with the drill chuck 28. The threads 24 at the proximal end of the device member 12 are engageable with the threaded spindle 30 and are right handed in the preferred embodiment to cooperate with the rotation of the grinder 26. The spindle 30 of a commercial grinder 26 typically has a thread size larger than a drill chuck 28. It is understood that various size spindles 30 and chucks 28 have varying size threads and varying standards such as metric. The specification describes embodiments currently having a wide use but it is expected that those of ordinary skill in the art will use variations in thread size to accommodate their specific needs.

FIG. 5 illustrates this arrangement in an exploded view. The drill chuck 28 is also illustrated in FIG. 5. As is well known in the art, drill chucks 28 comprise a finer threaded bore than do grinder spindles 30 and are therefore not compatible. The finer threaded shaft 22 of the device member distal end 16 is engageable with the finer thread of the chuck 28. By engaging the distal end 16 with the chuck 28, the grinder 26 is capable of use with the drill chuck 28.

Reference is now made to FIG. 6. In an alternate embodiment, the member 12 is made as an elongated member 30 and is useful as an extended device 32 having a proximal end 34 and a distal end 36. FIG. 6 illustrates an elongated device 32 in combination with the device 10 of FIG. 1. The proximal end 34 is similar to the member 12 proximal end 14 in one embodiment. In this way, the proximal end 34 is engageable with the grinder spindle 30. The distal end 36 of the elongated member 30 comprises threads 38 engageable with the threads 24 of the device 10 described as the preferred embodiment. The elongated device 32 performs as an extension tool for use with the device 10. In another embodiment as illustrated in FIG. 7, the elongated device 32 comprises fine thread 40 at the distal end 36 for engaging directly with the drill chuck 28. The length of the elongated member 30 will be based on the typical use in the specific trade requiring its use. FIG. 8 illustrates the elongated device 32 used directly with the grinder 26 and the chuck 28.

In the embodiments described, the flat surfaces 20 were configured as a ⅝" nut. Chuck thread sizes were typically ⅜"-24 and ½"-24. The grinder 26 comprises a ⅝"-11 spindle thread size. It is anticipated that any number of sizes and combinations will be used based on the grinder 26 and the chuck 28 of interest to a tradesman performing his required tasks.

The use of the drill chuck 28 with the portable angle grinder 26 permits the myriad of drill chuck accessories 42 available and well known in the art to be used to complete the tasks at hand for the specific tradesman. FIG. 9 comprises examples of accessories 44, 46, 48, 50, 52, 54 and 56 typically used in the trades. The exemplary accessories shown in FIG. 9 and further tabulated in FIG. 10 where an accessory is shown as typically used in a specific trade such as the electrician discussed earlier. As is well known in the art, the drill chuck 28 comprises jaws 58 that receive the accessory and held in position within the jaws 58 by tightening on the chuck collar 60. The accessories listed in FIGS. 9 and 10 are presented in the way of example only and are not meant to be limiting. In addition, the list of trades presented is not meant to be limited to those shown but only to illustrate the variety of trades affected and typically expected to use the invention.

Eleven trades and thirty seven tools used in these trades have been identified in way of example and tabulated in FIG. 11. As referred to earlier, the electrician is shown here as an example of using nineteen tools to perform his typical tasks and only eleven tools when the invention is incorporated into his toolbox. FIG. 11 illustrates this by identifying the tools typically used with "o" and adding a "•" for the tools the electrician would need when having the invention available for use. In addition to the savings in the quantity of tools, the available reduction of five motor driven tools (knock-out set, electric drill, portable ban saw, hole cutting saw and pin wheel grinder) for the electrician is very much a factor and important in reducing the load and costs associated with having to include these motor driven tools. Effort is saved for a worker who has to carry these tools. Time is saved if the worker has to check out these tolls from a tool crib at a job site or at the office. Typically, tool cribs are far removed from the job sites. FIG. 10 illustrates the accessories that the electrician would carry for use in the chuck 28 when being used with the device 10 or other embodiments of the invention.

Further reference to FIG. 11 illustrates time, labor and cost savings for other trades as well. In the way of example, the plumber and carpenter also reduce their motor tools by five. By referring to the tool list of FIG. 11 and accessory list of FIG. 10, it can be seen that the carpenter can reduce his load of tools, while completing functions such as grinding off unwanted nails that cannot be reached with a hammer, cleaning holes cut in wood, and cutting nails off in the roof ceiling that are a safety hazard to attic workers. For the locksmith, the slow physical work of using the hacksaw and most of the hand file effort is eliminated while providing both an easier and cleaner job.

As also illustrated in FIG. 11, the sheet metal worker becomes more versatile on the job site and more efficient. Time is cut by using a grinder 26 with a wafer 46 accessory in the drill chuck 28. A field cut can now be done or a field cut on the spot rather than having, as example, to climb from a site to the ground in order to perform a cut and then hauling the workpiece back to its preferred location. Typical grinders operate at high revolutions when compared to the typical drill. This provides a faster method for the cutting and grinding process. Grinders 26 typically operate at the 5,000 to 10,000 revolutions per minute (rpm) rate. Drills typically operate from zero to 2,500 rpm. While this is helpful to the grinding and cutting processes, drilling into thick materials will require the use of carbide tips for more efficient use. Grinders 26 operating on either alternating or direct current are well known in the art. It is anticipated that certain operations with the grinder 26, chuck 28, and device 10 combination are best achieved with variable current control devices such as the rheostat 31 illustrated in FIG. 4.

It is intended that the invention will provide the extended and alternate use of tools for the tradesmen as shown here by way of example. It is anticipated that even more examples will be used by those skilled in the art while certain specific embodiments of the present invention have been disclosed as typical, the invention is of course not limited to this particular form, but rather is applicable broadly to all such variations as fall within the scope of the enclosed appended claims.

What is claimed is:

1. A method for using a drill chuck with a grinder, the method comprising the steps of:
   providing a grinder having a spindle, the spindle having threads affixed thereto;
   removably affixing an adaptive member proximal end to the spindle, the proximal end having a thread for communicating with the spindle thread; and
   removably affixing a distal end of the member to a drill chuck the member distal end having threads communicating with drill chuck threads for affixing the drill chuck to the grinder.

2. The method as recited in claim 1 wherein the member comprises an elongated shaft.

3. The method as recited in claim 1 wherein the member further comprises a plurality of surfaces engageable by a wrench for affixing the member to the spindle and chuck.

4. A method for adapting a drill chuck to a portable grinder, the method comprising the steps of:
   providing a member having a proximal end and a distal end, the distal end having a threaded shaft for engaging a drill chuck the proximal end having a bore adapted to receive a spindle of a portable angle grinder; and
   affixing a plurality of flat surfaces to the member for engaging a wrench.

5. A method as recited in claim 4 wherein the member is an elongated member.

6. A method as recited in claim 4 wherein the shaft distal end comprises a fine thread adapted to be received by a drill chuck head, and the proximal end bore comprises a coarse thread for receiving a spindle of a portable angle grinder.

7. A method for affixing a drill chuck having a threaded end to a grinder spindle having a threaded end, the method comprising the steps of providing a shaft having a proximal end and a distal end, adapting the proximal end to receive the grinder spindle and adapting the distal end to receive the drill chuck head.

8. The method as recited in claim 7 wherein the shaft is an elongated shaft.

9. The method as recited in claim 7 wherein the device comprises a plurality of flat surfaces for engaging a wrench.

10. A method for engaging a grinder with a drill chuck for using drill chuck accessories with the grinder, the method comprising the steps of:
    providing a grinder having a spindle;
    providing a member having a proximal end and a distal end;
    affixing the proximal end to the grinder spindle;
    affixing a drill chuck to the distal end of the member; and
    affixing drill chuck accessories to the drill chuck.

11. A method as recited in claim 10 wherein providing the grinder comprises the step of providing a portable angle grinder.

12. A method as recited in claim 10 wherein affixing the member further comprises affixing an elongated member having a distal end and a proximal end.

13. A method as recited in claim 12 wherein affixing an elongated member further comprises:
    engaging the proximal end of the member to the distal end of the elongated member;
    affixing a drill chuck to the distal end of the member; and
    affixing the proximal end of the elongated member to the grinder spindle.

14. A method as recited in claim 10 further comprising the step of controlling speed of rotation of the spindle.

* * * * *